A. PETER.
LUBRICANT CONVEYING DEVICE.
APPLICATION FILED JAN. 24, 1914.
1,126,071.
Patented Jan. 26, 1915.
3 SHEETS—SHEET 1.
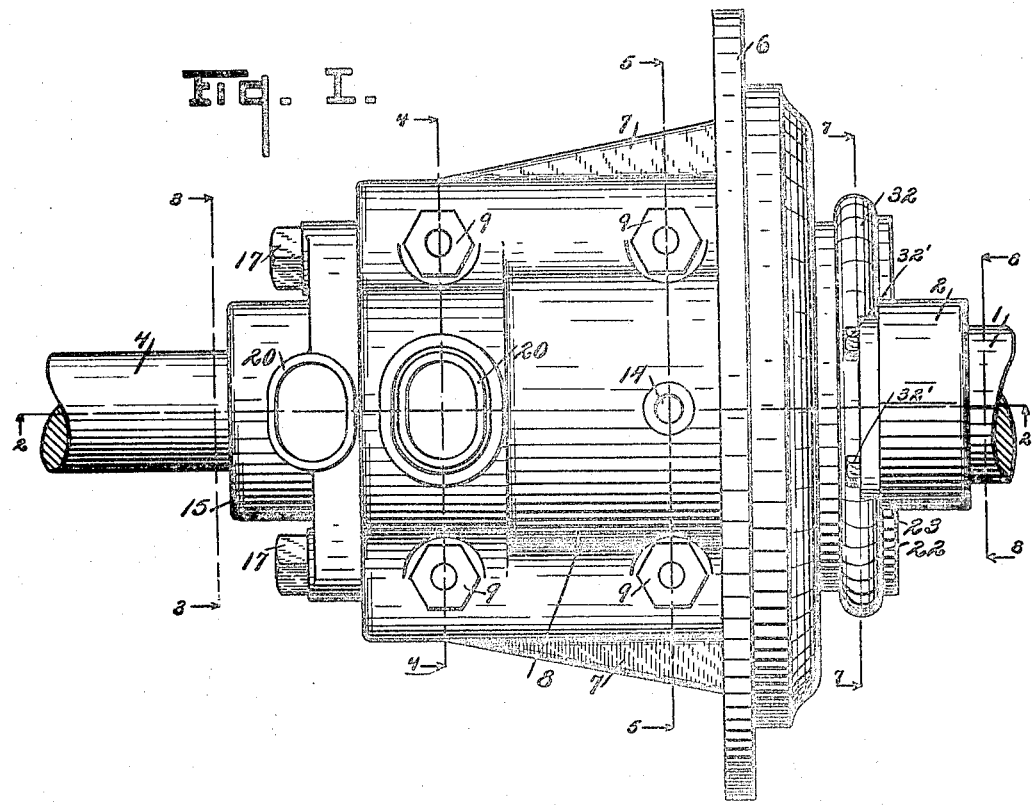

A. PETER.
LUBRICANT CONVEYING DEVICE.
APPLICATION FILED JAN. 24, 1914.
1,126,071.
Patented Jan. 26, 1915.
3 SHEETS—SHEET 2.
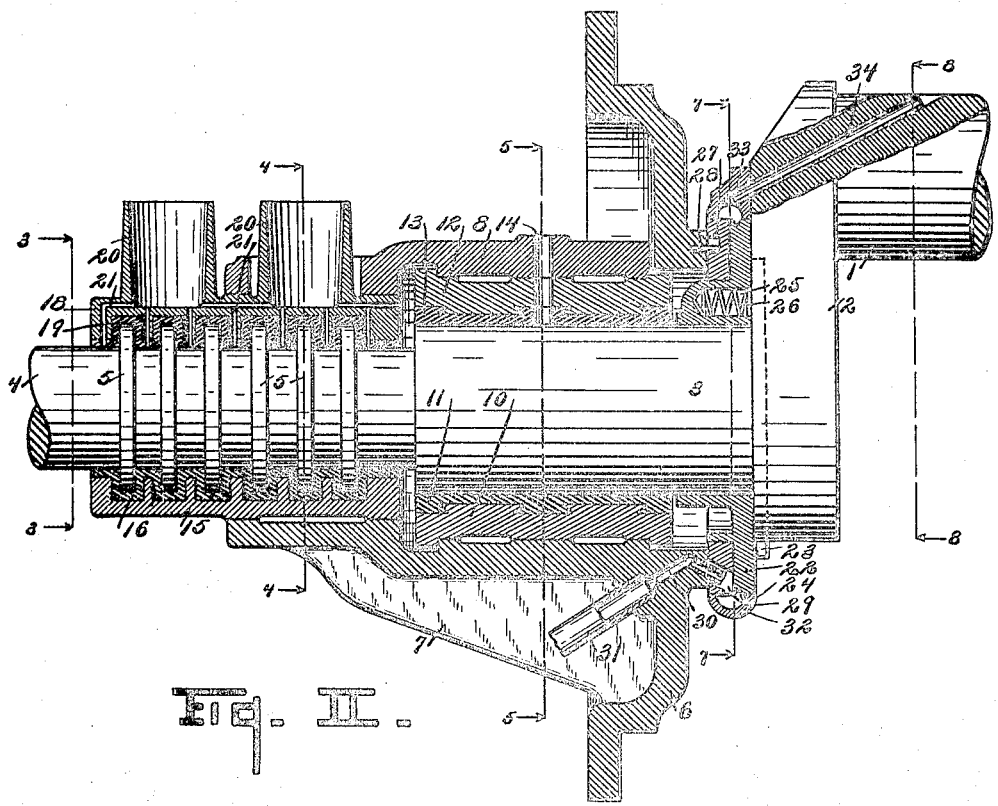
Fig. II.

A. PETER.
LUBRICANT CONVEYING DEVICE.
APPLICATION FILED JAN. 24, 1914.
1,126,071.
Patented Jan. 26, 1915.
3 SHEETS—SHEET 3.
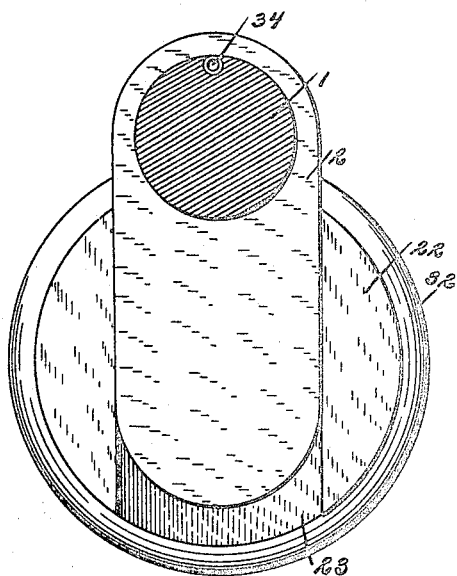
FIG. IV.
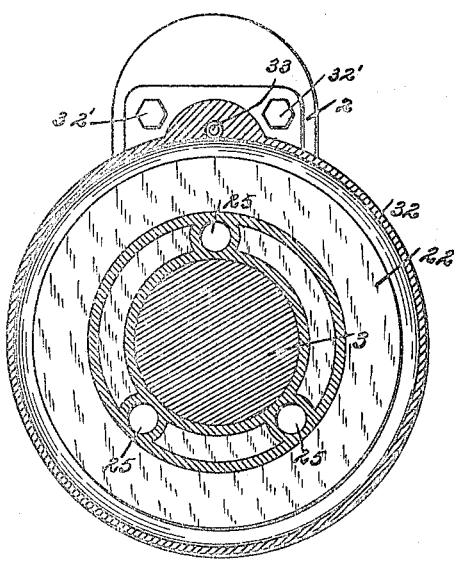
FIG. III.

UNITED STATES PATENT OFFICE.

ALFRED PETER, OF THREE RIVERS, MICHIGAN.

LUBRICANT-CONVEYING DEVICE.

1,126,071.  Specification of Letters Patent.  Patented Jan. 26, 1915.

Application filed January 24, 1914. Serial No. 814,186.

*To all whom it may concern:*

Be it known that I, ALFRED PETER, a citizen of Switzerland, residing at Three Rivers, Michigan, have invented certain new and useful Improvements in Lubricant-Conveying Devices, of which the following is a specification.

This invention relates to improvements in journal boxes for explosion engines, especially two cycle engines with crank case compression.

The objects of this invention are: First, to provide a journal box especially adapted for use in marine engines and having improved means for taking up the thrust on the propeller shaft. Second, to provide a device of this sort having means for lubricating the shaft which will not permit of the lubricating oil being sucked up into the engine or blown out of the bearing. Third, to provide in a device of this sort improved means for compensating for the wear on the packing washers. Fourth, to provide a device of this sort in which substances detrimental to lubrication are kept out of the oil ring used for crank-pin lubrication.

Further objects, and objects relating to details and economies of structure and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a top plan view of a structure embodying my invention. Fig. II is a longitudinal sectional view on a line 2—2 of Fig. I. Fig. III is a transverse sectional view on the line 7—7 of Figs. I and II. Fig. IV is a transverse sectional view on the line 8—8 of Figs. I and II.

In the drawing similar reference characters refer to similar parts throughout the several views and the sectional views are taken looking in the directiton of the little arrows at the ends of the section lines.

Considering the numbered parts of the drawing, 1 is the crank pin carried on the end of the crank arm 2 which is integral with the crank shaft 3. The main propeller shaft 4 is formed integral with the other end of the crank shaft, and said propeller shaft is provided with a plurality of integral annular flanges 5.

6 is the main journal casing, comprising an annular ring provided at its lower side with a semi-cylindrical seat supported by the web-like flanges 7. 6' are longitudinal abutments provided on each side of this semi-cylindrical seat. The casing is provided with a cover 8, the lower edges of which are adapted to seat on said abutments 6' and which is secured thereto by means of the bolts 9. In the inner end of said seat are provided the semi-cylindrical shells 10 carrying the Babbitt bearing 11. Resting on the shaft is the semi-cylindrical shell 12 carrying the babbitt 13.

14 is an oil passage provided through the cover 8, the shell 12 and the babbitt 12 to the shaft 3.

The main propeller shaft is provided with the semi-cylindrical shell 15, and said shell is provided with the babbitt 16. Shell 15 is provided with a plurality of flanges which project between the flanges 5, and the babbitt 16 is provided with corresponding grooves to receive said flanges 5. The upper part of this bearing comprises the shell 18 carrying the babbitt 19 and is provided with the oil cups 20, which supply the passages 21, passing through the shell and the babbitt 19, and delivering the oil directly on the propeller shaft. Shells 15 and 18 are held in place by means of the bolts 17 engaging in the abutments 6'. The heads of said bolts engage the ends of said shells.

On the crank shaft 3 is provided the flanged sleeve 22 having the groove 23 in which the crank arm 2 is seated, and provided on its periphery with the notch 24. Said sleeve 22 is provided with a plurality of recesses 25 in which are seated springs 26, the outer ends of which press against the crank arm 2 and tend to force the sleeve 22 away from said crank arm.

A washer 27 of babbitt or other suitable material is disposed between the flange of the flanged sleeve 22 and the casing 6 and kept from rotating by means of the pin 28. This washer is allowed to move downward and is provided at the bottom with a chamber 29 which is connected by means of the passage 30 in the casing 6 and the pipe 31 with the source of oil supply. Oil ring 32 is secured to the crank-arm 2 by cap-screws 32' and is disposed over the peripheries of said flanged sleeve and said washer, and said oil ring is provided with an annular channel which communicates with passage 29 and receives oil therefrom. A pipe 34 leads from a passage 33 communicating with said channel in the oil ring 32 through the end of the crank arm to the surface of the crank pin. The oil ring 32 is connected to the crank arm by means of cap-screws 32' so that it moves with the same and with the flanged sleeve 22, and hence turns on the edge of the Babbitt washer 27. This makes a tight joint between the washer 27 and the oil ring 32 and keeps out of the ring substances detrimental to lubrication.

From the description of the parts given above, the operation of the structure should be very readily understood. Oil is admitted to the oil ring 32 through the pipe 31, and the passages 30 and 29. The washer 27 is kept from rotating by means of the pin 28 but is free to move downward sufficient to compensate for wear, the hole for pin 28 being slightly slotted for that purpose. The oil ring 32 and flanged sleeve 22 rotate with the crank shaft 3. The oil fed into the annular channel of the oil ring through the passage 29 is thrown to the outer part thereof by centrifugal force and hence is forced out through the passages 33 and 34 to the surface of the crank pin 1 to lubricate the same.

The springs 26 tend to hold the flanged sleeve 22 away from the crank arm 2 and in contact with the washer 27. This serves to make a tight joint and to prevent the loss of air in case of two cycle crank-case compression. It also prevents the lubricating oil from being sucked into the crank-case or blown outside.

It will be seen that by means of this improved journal box, the shaft is effectively lubricated and longitudinal movement of the propeller shaft is prevented. Furthermore, practically none of the oil is introduced inside of the crank casing where it can be thrown by the crank and connecting rod, in the case of a two cycle engine, through the by-pass into the cylinder. This renders this form of bearing very desirable for use in connection with a hot head engine in which it is impossible to effectively control the engine, if the lubricating oil from the crank case finds its way into the cylinder where it is ignited, together with the fuel. The invention will also be found desirable for four cycle engines with inclosed crank cases.

I am aware that the particular embodiment which I have here set forth is susceptible of considerable variation without departing from the spirit of my invention, and, therefore, I do not wish to be restricted to the same. However, I have found by actual practice that this embodiment is to be preferred. I, therefore, desire to claim the same specifically as well as broadly, as indicated by the appended claims.

Having thus described my invention, what I claim as new and desire to secure by Letters Patent is:

1. In a structure of the class described, the combination of a crank shaft, a crank arm on said shaft, a crank pin on said arm, a journal casing, a suitable bearing for said shaft carried by said journal casing, a flanged sleeve mounted on said shaft, a groove in said sleeve in which said crank arm is seated, a plurality of sockets in said sleeve, springs seated in said sockets and bearing against said crank arm, a washer mounted on said flanged sleeve and secured against rotation with slight freedom of movement, an annular oil ring mounted over the peripheries of said sleeve and said washer, said groove forming a channel for receiving lubricating oil, a chamber in said washer communicating with said groove, a passage through said casing connected with the source of oil supply and communicating with said chamber, and a tube extending from said ring through said crank arm to the surface of said crank pin, said tube communicating with said oil channel, all coacting substantially as described for the purpose specified.

2. In a structure of the class described, the combination of a crank shaft, a crank arm on said shaft, a crank pin on said arm, a journal casing, a suitable bearing for said shaft carried by said journal casing, a flanged sleeve mounted on said shaft, a groove in said sleeve in which said crank arm is seated, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, a chamber in said washer communicating with said groove, a passage through said casing connected with the source of oil supply and communicating with said chamber, and a tube extending from said ring through said crank arm to the surface of said crank pin, said tube communicating with said oil channel, all coacting substantially as described for the purpose specified.

3. In a structure of the class described, the combination of a crank shaft, a crank arm on said shaft, a crank pin on said arm, a journal casing, a suitable bearing for said shaft carried by said journal casing, a flanged sleeve mounted on said shaft, means permitting longitudinal movement of said sleeve on said shaft connecting said sleeve to said crank arm, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, a chamber in said washer communicating with said groove, a passage through said casing connected with the source of oil supply and communicating with said chamber, and a tube extending from said ring through said crank arm to the surface of said crank pin, said tube communicating with said oil channel, all coacting substantially as described for the purpose specified.

4. In a structure of the class described, the combination of a crank shaft, a crank arm on said shaft, a crank pin on said arm, a journal casing, a suitable bearing for said shaft carried by said journal casing, a flanged sleeve mounted on said shaft and fixed thereto so as to rotate therewith, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, a chamber in said washer communicating with said groove, a passage through said casing connected with the source of oil supply and communicating with said chamber, and a tube extending from said ring through said crank arm to the surface of said crank pin, said tube communicating with said oil channel, all coacting substantially as described for the purpose specified.

5. In a structure of the class described, the combination of a crank shaft, a crank arm on said shaft, a crank pin on said arm, a journal casing, a suitable bearing for said crank shaft carried by said journal casing, a flanged sleeve mounted on said shaft and secured thereto so as to rotate therewith, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, means delivering lubricating oil to said channel, and a tube extending from said ring through said crank arm to the surface of said crank pin, said tube communicating with said oil channel, all coacting substantially as described for the purpose specified.

6. In a structure of the class described, the combination of a crank shaft, a crank arm on said shaft, a crank pin on said arm, a journal casing, a suitable bearing for said shaft carried by said journal casing, a flanged sleeve mounted on said shaft and secured thereto so as to rotate therewith, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, means delivering lubricating oil to said channel, and means communicating with said channel delivering lubricating oil to the surface of said crank pin, all coacting substantially as described for the purpose specified.

7. In a structure of the class described, the combination of a crank shaft, a journal casing, a suitable bearing for said shaft carried by said journal casing, a flanged sleeve mounted on said shaft and secured thereto so as to rotate therewith, a washer mounted on said flanged sleeve and secured against rotation with slight freedom of movement, an annular oil ring mounted over the peripheries of said sleeve and said washer, the inner periphery of said ring being provided with a groove, said groove forming a channel for receiving lubricating oil, means delivering lubricating oil to said channel, and means conducting oil from said channel to the part to be lubricated, all coacting substantially as described for the purpose specified.

In witness whereof, I have hereunto set my hand and seal in the presence of two witnesses.

ALFRED PETER. [L. S.]

Witnesses:
   LUELLA G. GREENFIELD,
   ANNIE E. PARRY.